US008335681B2

(12) United States Patent
Yin et al.

(10) Patent No.: US 8,335,681 B2
(45) Date of Patent: Dec. 18, 2012

(54) MACHINE-TRANSLATION APPARATUS USING MULTI-STAGE VERBAL-PHRASE PATTERNS, METHODS FOR APPLYING AND EXTRACTING MULTI-STAGE VERBAL-PHRASE PATTERNS

(75) Inventors: Changhao Yin, Daejeon (KR); Chang Hyun Kim, Daejeon (KR); Young Ae Seo, Daejeon (KR); Seong Il Yang, Daejeon (KR); Eun Jin Park, Daejeon (KR); Yun Jin, Daejeon (KR); Sung Kwon Choi, Daejeon (KR); Ki Young Lee, Daejeon (KR); Oh Woog Kwon, Daejeon (KR); Yoon Hyung Roh, Daejeon (KR); Ying Shun Wu, Daejeon (KR); Young Kil Kim, Daejeon (KR); Sang Kyu Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 812 days.

(21) Appl. No.: 12/464,121

(22) Filed: May 12, 2009

(65) Prior Publication Data
US 2010/0057437 A1    Mar. 4, 2010

(30) Foreign Application Priority Data
Aug. 28, 2008    (KR) .................. 10-2008-0084626

(51) Int. Cl.
*G06F 17/28*    (2006.01)
(52) U.S. Cl. ................. 704/4; 704/2; 704/277
(58) Field of Classification Search ............... 704/1–10, 704/251, 257, 255, 277
See application file for complete search history.

(56) References Cited

U.S. PATENT DOCUMENTS
7,254,531 B2 *    8/2007    Nir .................................. 704/10
7,447,628 B2    11/2008    Ryu et al.

FOREIGN PATENT DOCUMENTS
KR    10-2002-0003574    1/2002
KR    10-2005-0063815    6/2005
(Continued)

OTHER PUBLICATIONS

"Korean-Chinese Machine Translation Based on Verb Patterns", Changhyun Kim et al., 2002 Lecture Notes in Computer Science pp. 94-103.
(Continued)

*Primary Examiner* — Huyen X. Vo
(74) *Attorney, Agent, or Firm* — Staas & Halsey LLP

(57) ABSTRACT

A machine-translation apparatus using multi-level verbal-phrase patterns includes: a simple sentence generation unit for generating an input simple sentence; a basic verbal-phrase pattern-matching unit for trying a match of a semantic code of each case component of the input simple sentence with basic verbal-phrase patterns; a default verbal-phrase pattern matching unit for trying a match of a size and case prepositions of the input simple sentence with default verbal-phrase patterns having a verb identical to that of the input simple sentence; a default word-order matching unit for trying a match of a word-order of the input simple sentence with default word-order verbal-phrase patterns having a case component structure identical to that of the input simple sentence; and a default preposition matching unit for generating a target sentence of an input sentence with default preposition patterns having a context identical to that of the input simple sentence.

7 Claims, 4 Drawing Sheets

FOREIGN PATENT DOCUMENTS

KR     10-2006-0067073        6/2005

OTHER PUBLICATIONS

"Efficient Korean Predicates Processing for Korean-English Machine Translation System", Hong-won Park et al., The 13th Conference on Hangul and Korean Language Processing.

"Translation Method of '-hada' verb in a Korean-to-Japanese Machine Translation", Kyong-hi Moon, The Korean Society of Computer & Information, Sep. 2005.

Korean Office Action mailed Apr. 22, 2010 in corresponding Korean Application No. 10-2008-0084626.

* cited by examiner

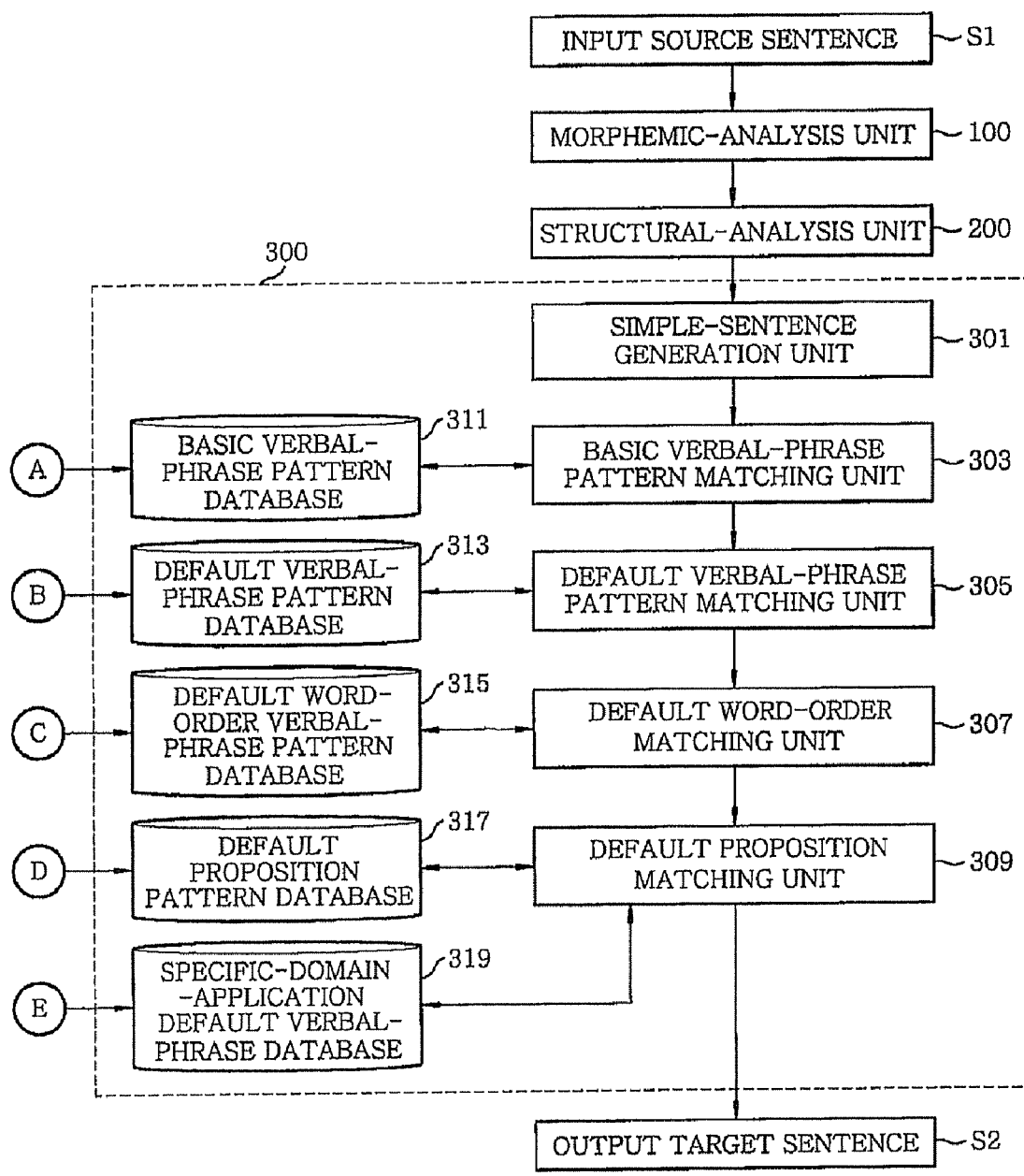

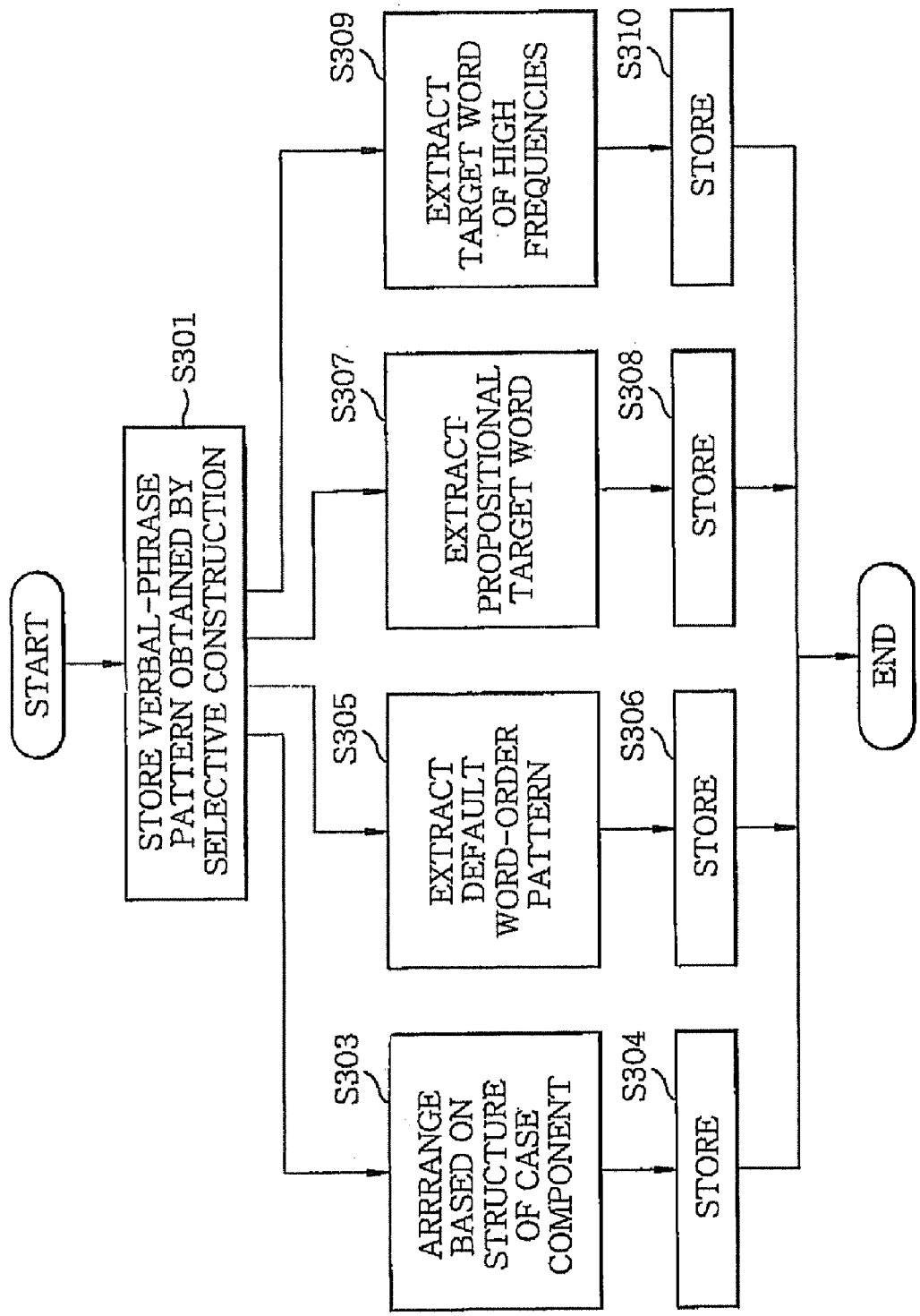

MACHINE-TRANSLATION APPARATUS USING MULTI-STAGE VERBAL-PHRASE PATTERNS, METHODS FOR APPLYING AND EXTRACTING MULTI-STAGE VERBAL-PHRASE PATTERNS

CROSS-REFERENCE(S) TO RELATED APPLICATION(S)

The present invention claims priority of Korean Patent Application No. 10-2008-0084626, filed on Aug. 28, 2008, which is incorporated herein by reference.

FIELD OF THE INVENTION

The present invention relates to machine translation using multi-stage verbal-phrase patterns; and, more particularly, to a machine-translation apparatus with translation performance improved by using multi-stage verbal-phrase pattern matching techniques, to methods of applying multi-stage verbal-phrase patterns for the translation apparatus and to methods of automatically extracting multi-stage verbal-phrase patterns.

BACKGROUND OF THE INVENTION

As is well known, the most crucial data in a pattern-based machine-translation apparatus are verbal-phrase patterns.

The roles played by the verbal-phrase patterns in a machine-translation apparatus are two-fold: firstly, to convert precisely a lexicon such as verbs, adverbial prepositions and objective prepositions used in input simple sentences into a corresponding target language as a means to resolve lexical polysemy; and, secondly, to rearrange accurately order of words when a structure of every component of a source language is converted to a completely different target language from a viewpoint of linguistic structure.

Because performance of a verbal-phrase pattern matching has a great influence upon an over-all system in a pattern-based translation apparatus, it is necessary to construct a large amount of high-quality verbal-phrase patterns in order to improve performance of the apparatus.

If pre-constructed semantics-based verbal-phrase patterns are used, each case component is converted to semantic information so that accuracy of pattern matching is enhanced and conversion of a corresponding verb into a target word becomes accurate.

In this case, while the matching accuracy is enhanced, rate of reproduction becomes too low, because semantic codes of all case components of the patterns are referenced when the matching is carried out. Analysis of illustrative cases of pattern application shows that subjective semantic information has little influence on conversion of verbs and word orders. Hence, it would be inefficient to attach the semantic code and supervise them in the course of constructing a large amount of patterns.

Since the pattern is determined based on the semantics in the pre-constructed semantic-based verbal-phrase patterns, it is necessary to construct all the patterns by semantic codes equivalent to an objective case of the pattern.

For example, about 70% of the verbs of Korean language are Chinese verbs and most Chinese verbs have fixed target words and word orders regardless of semantic information of objective components. As such, if Korean-Chinese verbal-phrase patterns are constructed as pre-constructed verbal-phrase patterns and a verbal-phrase pattern is generated for each case-component structure, then for enough number of verbs there will be hundreds of redundant patterns. This implies that, unless verbal-phrase patterns are constructed with a variety of semantics of Korean verbs taken into account, a number of verbal-phrase patterns to construct increases dramatically, posing a primary obstacle to enhancement of the performance of a translation apparatus.

SUMMARY OF THE INVENTION

In view of the above, the present invention provides an apparatus using multi-stage verbal-phrase patterns that enhances the performance of translation by applying a multi-stage verbal-phrase pattern matching technique and applies verbal-phrase patterns in multiple stages and extracts automatically the multi-stage verbal-phrase patterns.

Further, the present invention provides a method of applying a multi-stage verbal-phrase pattern matching technique.

Furthermore, the present invention provides a method of automatically extracting multi-stage verbal-phrase patterns.

In accordance with a first aspect of the present invention, there is provided a machine-translation apparatus using multi-level verbal-phrase patterns, including:

a basic verbal-phrase pattern database storing therein basic verbal-phrase patterns;

a default verbal-phrase pattern database storing therein default verbal-phrase patterns;

a default word-order verbal-phrase pattern database storing therein default word-order verbal-phrase patterns;

a default preposition database storing therein default preposition patterns;

a simple sentence generation unit for generating, by recomposing an input sentence, an input simple sentence having a structure of verbal-phrase patterns;

a basic verbal-phrase pattern-matching unit for trying a match of a semantic code of each case component of the input simple sentence with the basic verbal-phrase patterns;

a default verbal-phrase pattern matching unit for trying, if the basic verbal-phrase pattern-matching unit fails a complete match, a match of a size and case prepositions of the input simple sentence with the default verbal-phrase patterns having a verb identical to that of the input simple sentence;

a default word-order matching unit for trying, if the default verbal-phrase pattern matching unit fails a complete match, a match of a word-order of the input simple sentence with the default word-order verbal-phrase patterns having a case component structure identical to that of the input simple sentence; and a default preposition matching unit for generating, if the default word-order verbal-phrase pattern matching unit succeeds in a complete match, a target sentence of the input sentence with the default preposition patterns having a context identical to that of the input simple sentence.

Preferably, the basic verbal-phrase patterns stored in the basic verbal-phrase pattern database are verbal-phrase patterns selected based on target-word-varieties and/or pattern-lengths.

Preferably, the default verbal-phrase pattern database is constructed by automatically extracting verbal-phrase patterns from the basic verbal-phrase patterns, sorting the extracted verbal-phrase patterns by verbs, arranging each of the sorted verbal-phrase patterns based on a case component structure thereof, performing default-conversion by replacing case components of each of the arranged verbal-phrase patterns with a symbol representing default concept and storing in the default verbal-phrase pattern database the default-converted verbal-phrase patterns as the default verbal-phrase patterns.

Preferably, the default word-order verbal-phrase pattern database is constructed by storing therein, as the default word-order verbal-phrase patterns, the default verbal-phrase patterns where a verb of each of the default verbal-phrase patterns has been replaced with a symbol representing default concept.

Preferably, the default preposition database is constructed by storing therein prepositional target words as the default preposition patterns, the prepositional target words being extracted from the basic verbal-phrase patterns and corresponding to contexts of the basic verbal-phrase patterns.

Preferably, the machine-translation apparatus further includes a specific-domain-application default verb database storing therein high-frequency target words of verbs for a specific domain, wherein, if the default word-order verbal-phrase pattern matching unit succeeds in a complete match and the input sentence belongs to a document for the specific domain, the target sentence is generated with the target words stored in the specific-domain-application default verb database.

Preferably, the default verbal-phrase pattern matching unit diminishes weight of a subjective case and augments weights of case components other than the subjective case, by replacing the subjective case with a symbol representing a default concept.

In accordance with a second aspect of the present invention, there is provided an application method for a machine-translation apparatus, wherein the apparatus includes a basic verbal-phrase pattern database storing therein basic verbal-phrase patterns, a default verbal-phrase pattern database storing therein default verbal-phrase patterns, a default word-order verbal-phrase pattern database storing therein default word-order verbal-phrase patterns and a default preposition database storing therein default preposition patterns, the method including:

analyzing morphemes of an input sentence in a source language;

analyzing a structure of the input sentence whose morphemes have been analyzed;

generating, by recomposing an input sentence, an input simple sentence having a structure of verbal-phrase patterns;

trying a match of a semantic code of each case component of the input simple sentence with the basic verbal-phrase patterns;

trying, if the basic verbal-phrase pattern-matching unit fails a complete match, a match of a size and case prepositions of the input simple sentence with the default verbal-phrase patterns having a verb identical to that of the input simple sentence;

trying, if the default verbal-phrase pattern matching unit fails a complete match, a match of a word-order of the input simple sentence with the default word-order verbal-phrase patterns having a case component structure identical to that of the input simple sentence; and generating, if the default word-order verbal-phrase pattern matching unit succeeds in a complete match, a target sentence of the input sentence with the default preposition patterns having a context identical to that of the input simple sentence.

Preferably, if the basic verbal-phrase pattern-matching unit succeeds in a complete match, those matched patterns are used as the target sentence.

Preferably, if the default verbal-phrase pattern matching unit succeeds in a complete match, those matched patterns are used as the target sentence.

Preferably, if the default word-order verbal-phrase pattern matching unit succeeds in a complete match, target words of a verb and case prepositions are generated to produce the target sentence having those matched word-order.

In accordance with a third aspect of the present invention, there is provided an extraction method for a machine-translation apparatus using multi-level verbal-phrase patterns, including:

storing, as basic verbal-phrase patterns, verbal-phrase patterns selected based on target-word-varieties and/or pattern-lengths;

sorting the verbal-phrase patterns by verbs, arranging each of the sorted verbal-phrase patterns based on a case component structure thereof, performing default-conversion by replacing case components of each of the arranged verbal-phrase patterns with a symbol representing default concept and storing the default-converted verbal-phrase patterns as the default verbal-phrase patterns;

storing, as default word-order verbal-phrase patterns, the default verbal-phrase patterns where a verb of each of the default verbal-phrase patterns has been replaced with a symbol representing default concept;

storing, as the default preposition patterns, the prepositional target words being extracted from the basic verbal-phrase patterns and corresponding to contexts of the basic verbal-phrase patterns; and storing high-frequency target words of verbs for a specific domain.

A high-performance machine-translation apparatus can be constructed by the present invention that applies a verbal-phrase pattern matching technique in multiple stages and extracts multi-stage verbal-phrase patterns automatically. The present invention provides not only the translation apparatus using multi-stage verbal-phrase patterns but also application and extraction methods for the apparatus, which translate a source language into a target language and can solve polysemy of linguistic structure such as lexicon and word orders that takes place during the course of translation between different languages.

BRIEF DESCRIPTION OF THE DRAWINGS

The above features of the present invention will become apparent from the following description of embodiments, given in conjunction with the accompanying drawings, in which:

FIGS. 1A and 1B illustrate a block diagram of a machine-translation apparatus that uses multi-stage verbal-phrase patterns in accordance with an embodiment of the present invention;

FIG. 3 illustrates a flow chart that explains details of a method extracting default patterns automatically from basic verbal-phrase patterns in the machine-translation apparatus of FIG. 2.

DETAILED DESCRIPTION OF THE EMBODIMENTS

Hereinafter, embodiments of the present invention will be described in detail with reference to the accompanying drawings.

Figure 1A:
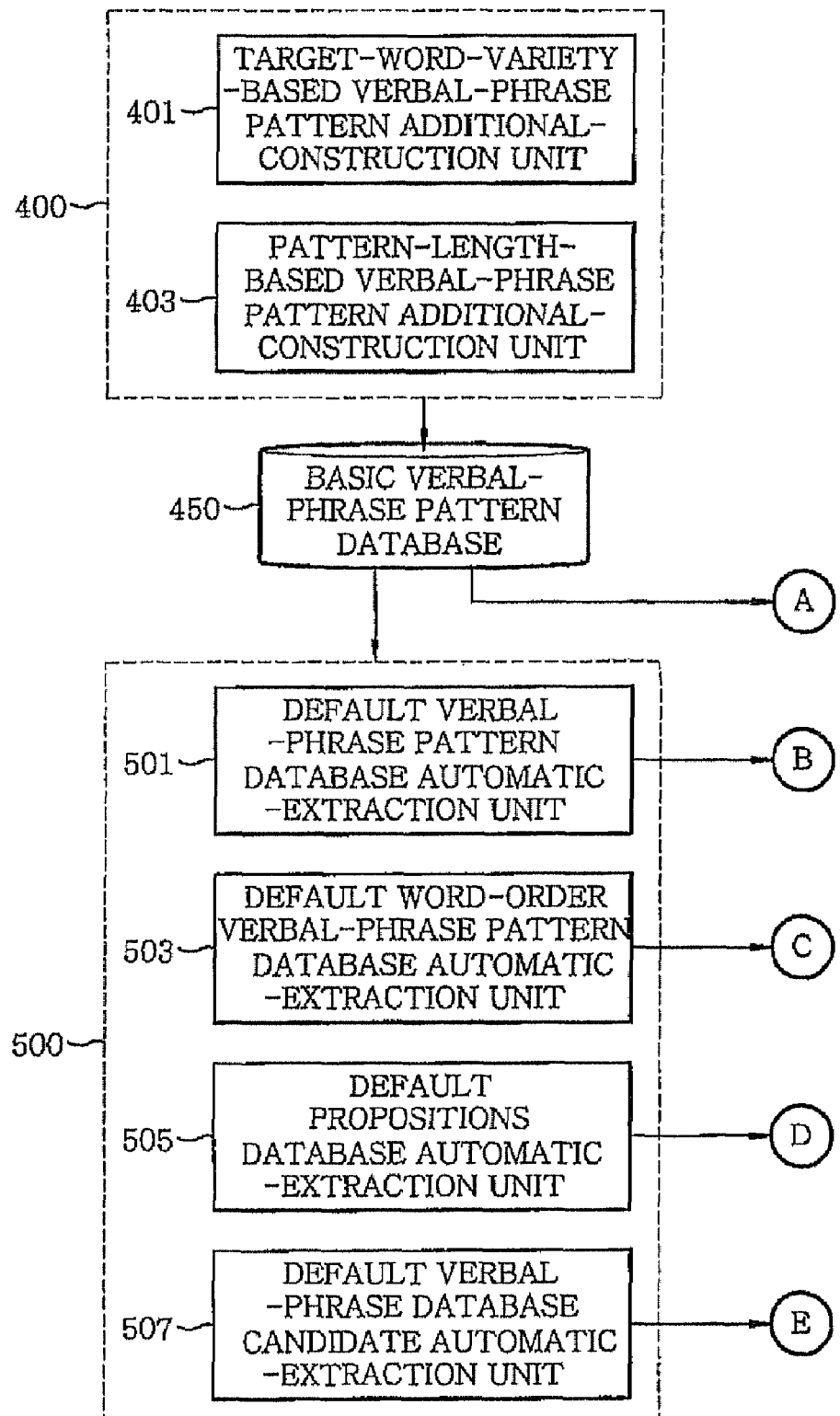

FIGS. 1A and 1B illustrate a block diagram of a translation apparatus using multi-stage verbal-phrase patterns in accordance with an embodiment of the present invention. The translation apparatus includes a morphemic-analysis unit 100, a structural-analysis unit 200, a verbal-phrase pattern multi-stage application unit 300, a verbal-phrase pattern additional-construction unit 400, a basic verbal-phrase pattern database 450 and a default pattern automatic-extraction unit 500.

The morphemic-analysis unit 100 analyzes morphemes of an input sentence S1 in a source language and provides a result to a structural-analysis unit 200.

The structural-analysis unit 200 analyzes a structure of the input sentence processed by the morphemic-analysis unit 100 and provides a result to a verbal-phrase pattern multi-stage application unit 300.

The verbal-phrase pattern multi-stage application unit 300 includes a simple-sentence generation unit 301, a basic verbal-phrase pattern matching unit 303, a default verbal-phrase pattern matching unit 305, a default word-order matching unit 307, a default proposition matching unit 309, a basic verbal-phrase pattern database 311, a default verbal-phrase pattern database 313, a default word-order verbal-phrase pattern database 315, a default proposition database 317 and a specific-domain-application default verb database 319.

The simple-sentence generation unit 301 recomposes the input sentence whose structure has been analyzed by the structural-analysis unit 200 into simple sentences having a structure of verbal-phrase patterns to convert the input sentence to a target language. The simple-sentence generation unit 301 then passes a result to the basic verbal-phrase pattern matching unit 303.

The basic verbal-phrase pattern matching unit 303 carries out a semantic-based matching of the input sentence recomposed by the simple-sentence generation unit 301. Here, the matching is performed between the input simple sentence and basic verbal-phrase patterns previously stored in the basic verbal-phrase pattern database 311. It should be pointed out that at this stage a complete matching is attempted between a semantic code of each case component of the input sentence and that of the predetermined basic verbal-phrase patterns.

When the basic verbal-phrase pattern matching unit 303 produces a complete matching or most of case components are successfully matched, the basic verbal-phrase patterns become a target sentence. However, when the semantic codes of the case components have no match or a match score thereof is below a predetermined critical value, the default verbal-phrase pattern-matching unit 305 carries out matching between the input simple sentence and default verbal-phrase patterns of corresponding verb having the same case prepositions and same size, stored in the default verbal-phrase pattern database 313. For example, while most of Chinese verbs in Korean language have fixed sentence structures and their target words, regardless of semantics of objective case components, the match score is relatively low when they are matched by the basic verbal-phrase pattern-matching unit 303 which is based on the semantic codes.

If the default verbal-phrase pattern-matching unit 305 succeeds in a complete matching, a verb can be matched effectively and efficiently with low lexical polysemy although a polysemy associated with the word-order structure exists. In this case, the default verbal-phrase pattern is used in the target sentence. If a complete matching is failed, however, the input simple sentence is passed to the default word-order matching unit 307.

In case the default verbal-phrase pattern-matching unit 305 does not produce a complete matching, the default word-order matching unit 307 attempts a matching between the input simple sentence and default word-order verbal-phrase patterns stored in the default word-order verbal-phrase patterns database 315.

When the attempted matching is successful, the target sentence is produced using the input simple sentence having been subjected to the default word-order matching. When failed, however, a default target sentence is generated.

When the default word-order matching unit 307 produces a complete matching, the default proposition matching unit 309 applies default proposition patterns stored in the default proposition database 317 in order to resolve prepositional polysemy of each case component and generates defaults based on the rules, which leads to an output sentence S2 completed by applying final verbal-phrase patterns. Note that if the input sentence S1 is from a patent document or a technical paper, matching is carried out by applying the specific-domain-application default verb database 319 to take into consideration of a case where the target words are fixed from a lexical viewpoint.

The basic verbal-phrase patterns database 311 stores basic verbal-phrase patterns entered from a verbal-phrase pattern additional-construction unit 400 and constructed by selection.

The default verbal-phrase patterns database 313 stores patterns arranged by a default verbal-phrase pattern database automatic-extraction unit 501.

The default word-order verbal-phrase pattern database 315 stores patterns extracted automatically and then arranged by a default word-order verbal-phrase pattern database automatic-extraction unit 503.

The default proposition database 317 stores patterns extracted in the order of frequency and then arranged by a default proposition database automatic-extraction unit 505.

The specific-domain-application default verb database 319 stores high-frequency target words extracted by a default verbal-phrase database candidate automatic-extraction unit 507.

The verbal-phrase pattern additional-construction unit 400 includes a target-word-variety-based verbal-phrase pattern additional-construction unit 401 and a pattern-length-based verbal-phrase pattern additional-construction unit 403.

In the course of the construction based on a semantic variety of a source language by the target-word-variety-based verbal-phrase pattern additional-construction unit 401, only one pattern is constructed for each of verbs of Chinese origin such as " 개발하다 " because of an absence of lexical polysemy in an one-to-one conversion to Chinese language, and a classification of a variety of verbs is carried out by automatically arranging and extracting from the predetermined basic verbal-phrase pattern database. To do this in an objective manner, computed is a frequency of usage of the most frequent target word in comparison with the entire target words. For such words whose frequencies exceeds a given critical value, mass construction is not carried out. However, mass construction is needed for those words of low frequencies because there exist a variety of target words for them. It should be noted that those words of Chinese origin (e.g. 개발하다, 발명하다 ) have high frequencies of the first target words, whereas those of genuine Korean origin (e.g. 뜨다, 올리다, 열다 ) have low frequencies of the first target words.

In a pattern-length-based verbal-phrase pattern additional-construction unit 403, verbal-phrase patterns are intensively constructed for verbs of low frequencies of the first target word whereas those of high frequencies that have little lexical polysemy are subject to selective construction based on a pattern length. The verbal-phrase patterns belonging to the latter category are supplied to the basic verbal-phrase pattern database 450.

The basic verbal-phrase pattern database 450 stores the verbal-phrase patterns supplied from a verbal-phrase pattern additional-construction unit 400.

The default pattern automatic-extraction unit 500 includes a default verbal-phrase pattern database automatic-extraction unit 501, a default word-order verbal-phrase pattern database automatic-extraction unit 503, a default proposition database automatic-extraction unit 505 and a default verbal-phrase database candidate automatic-extraction unit 507.

The default verbal-phrase pattern database automatic-extraction unit 501 arranges the verbal-phrase patterns stored in the basic verbal-phrase patterns database 450 and rearranges them according to case components stored for each verbal phrase to store in the default verbal-phrase patterns database 313.

The default word-order verbal-phrase pattern database automatic-extraction unit 503 stores in the default word-order verbal-phrase patterns database 315 a default pattern "*가 *을 DFLTVERB>*(default) DFLTVERB*(default)" which has been arranged from a default verbal-phrase patterns such as "*가 *을 개발하다 >*(default) 開發 *(default)" and "*가 *을 발명하다 >*(default) 發明*(default)" that have been automatically extracted among those constructed selectively in the basic verbal-phrase pattern database 450.

The default proposition database automatic-extraction unit 505 extracts in order of frequency, from a verbal-phrase pattern "A: 국내(위치)에서 개발하다 > 在(에서) 國內(국내) 開發(개발하다)" that has been constructed selectively in the basic verbal-phrase pattern database 450, a prepositional target word "在" for the preposition "에서" as in a pattern "위치에서 개발하다 >在".. The prepositional target word, which is compatible with the context such as a verb "개발하다" and a case-component semantic code "위치", is stored in the default proposition database 317 after arrangement.

The default verbal-phrase database candidate automatic-extraction unit 507 extracts a high-frequency target words from patterns stored in the basic verbal-phrase pattern database 450 and stores in the specific-domain-application default verb database 319 to use as the candidates for the default verbal target words.

Therefore, the present invention uses multi-stage verbal-phrase pattern-matching technique to enhance the performance of translation, applies verbal-phrase patterns for a translation apparatus in multiple stages and extracts multi-stage verbal-phrase patterns automatically so that a machine-translation apparatus of high performance can be constructed.

In the following, an operation process is explained of the translation apparatus using multi-stage verbal-phrase patterns with said configurations.

Figure 2:
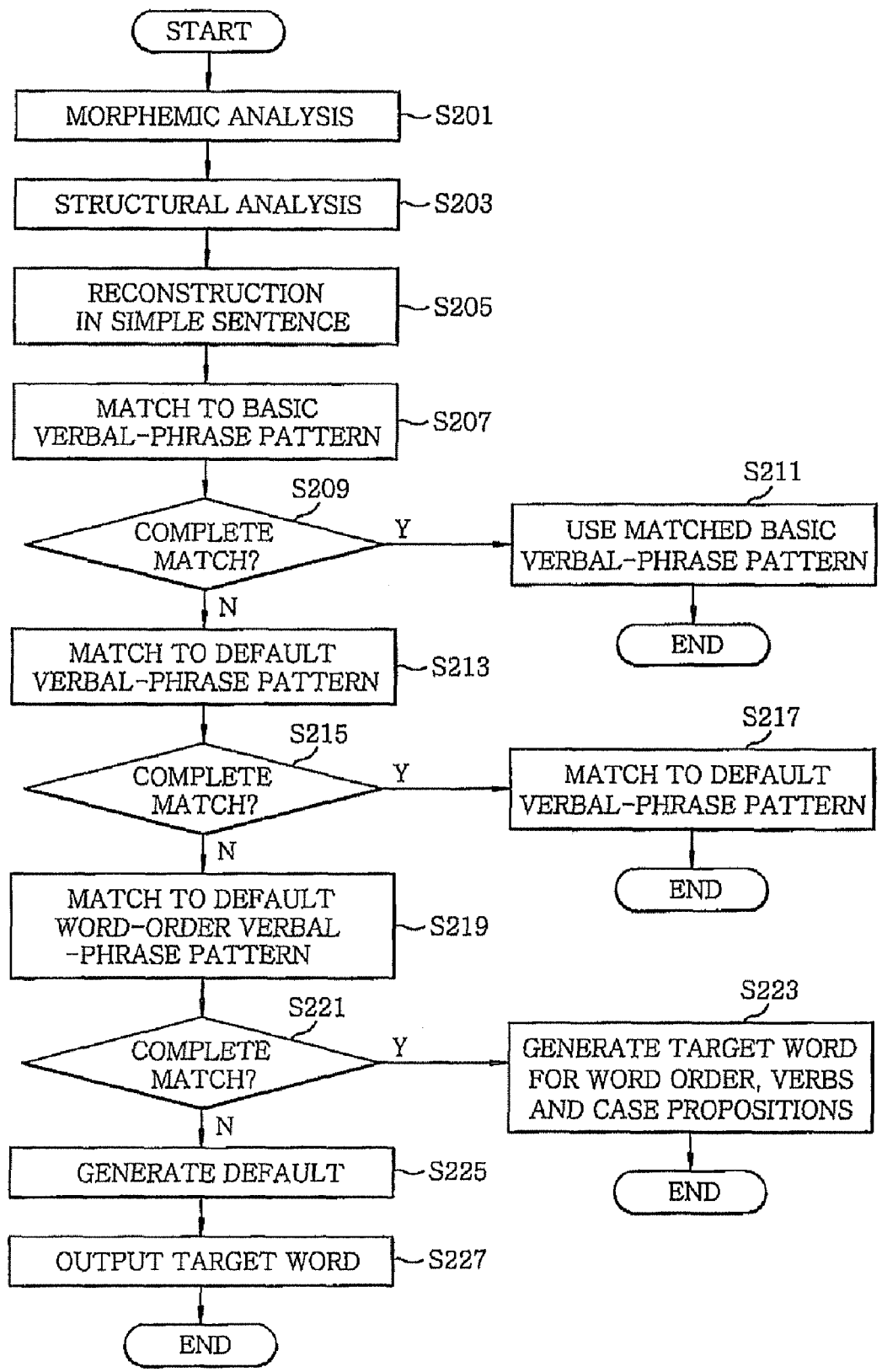
FIG. 2 illustrates a flow chart that explains details of a multi-stage pattern-matching method in the machine-translation apparatus of FIGS. 1A and 1B.

FIG. 2 illustrates a flowchart that describes in detail application methods for the translation apparatus of FIGS. 1A and 1B.

In the first place, a morpheme analysis of an input sentence S1 in source language is carried out in the morphemic-analysis unit 100 (step S201). Then, a structural analysis is performed in the structural-analysis unit 200 (step S203), passing the result to the simple-sentence generation unit 301 residing in the verbal-phrase pattern multi-stage application unit 300.

The input sentence whose structure has been analyzed by the structural-analysis unit 200 is reconstructed in simple sentences by the simple-sentence generation unit 301 before being supplied to the basic verbal-phrase pattern matching unit 303 (step S205).

In the basic verbal-phrase pattern matching unit 303 where the recomposed input simple sentence is supplied from the simple-sentence generation unit 301, match to the basic verbal-phrase patterns is performed of the patterns stored in the basic verbal-phrase pattern database 311 for all the case components of the input sentence (step S207). Here, the basic verbal-phrase pattern matching unit 303 attempts a complete match between the semantic code of each case component of the input simple sentence and that of the predetermined basic verbal-phrase patterns.

In order to enhance the performance of matching in the course of matching carried out in the basic verbal-phrase pattern matching unit 303, the weight of the subjective case is lowered by introducing the "*" default concept from the verbal-phrase pattern based on semantics, whereas the weights are raised of case components other than the subjective case including those of adverbial or objective case.

In the default verbal-phrase pattern matching unit 305, match of the basic verbal-phrase pattern is examined by the basic verbal-phrase pattern matching unit 303 as to whether the match is complete or most case components are matched to the semantic codes (step S209).

If it is decided in the step S209 that a complete match occurs, the matched basic verbal-phrase pattern is used (step S211).

If it is decided in the step S209 that, on the contrary, the case component produces little match or the match score does not exceed the predetermined critical value (for example, although most Korean verbs of Chinese origin have fixed sentence structures and target words regardless of semantics of an objective component, the basic verbal-phrase pattern matching unit 303 based on the semantic code gives a low match score), the default verbal-phrase pattern matching unit 305 carries out match to the default verbal-phrase patterns a default pattern, which is stored in the default verbal-phrase patterns database 313 and corresponds verb of the same case preposition and same length, in order to resolve a polysemy of word order and target words (step S213). The matched default verbal-phrase pattern is then passed to the default word-order matching unit 307.

For example, if a pattern "A: 회사(조직)가 신약(의약품)을 개발하다 > 公司(회사) 開發(개발하다) 新藥品(신약품)" is the input sentence and there exists only a pattern "B: 회사(조직)가 신기술(지식)을 개발하다 > 公司(회사) 開發(개발하다) 新技術(신기술)" in the predetermined basic verbal-phrase pattern database, a matching failure takes place since their objective semantic codes are different (의약품 != 지식) In this case, without having to newly construct the pattern A, an effective and efficient matching can be carried out for those verbs of Chinese origin with low lexical polysemy, if the default pattern "C: *가 *를 개발하다 >*(default) 開發(개발하다) *(default)" associated with the pattern B is automatically extracted using the default verbal-phrase pattern database, even though there exist a word-order structural polysemy like "개발하다".

The default word-order matching unit 307 examines whether the default verbal-phrase patterns are matched completely by the default verbal-phrase pattern matching unit 305 (step S215).

If a complete match occurs in the step S215, the pattern that matches is used (step S217).

If the match is incomplete in the step S215, on the contrary, the default word-order matching unit 307 carries out match to the default word-order verbal-phrase patterns stored in the default word-order verbal-phrase patterns database 315 and supplies the matched pattern to the default proposition matching unit 309 (step S219).

For example, when a pattern "A: *가 *에서 *를 통해 *를 개발하다 >*(default) 在(에서) *(default) 通避(를 통해) *(default) 開發(개발하다) *(default)" is entered as the input and if there is no pattern A in the default verbal-phrase pattern database but pattern "B: *가 *에서 *를 통해 *를 발명하다 >*(default) 在(에서) *(default) 通避(를 통해) *(default) 發明(발명하다) *(default)", the default verbal-phrase pattern matching unit 305 ends up with a failure.

In order to resolve the match failure, the default pattern that has the same case structure as pattern A for the verb '발명하다' should be additionally constructed. However, because it is difficult to construct the default patterns having all case structures for all verbs, a concept of the default word-order verb-phrase pattern is introduced. That is, pattern "C: *가 *에서 *를 통해 *를 DFLTVERB>*(default) 在(에서) *(디폴트) 通避(를 통해) *(default) DFLTVERB (default verb)*(default)" does not show any specific verb but uses 'DFLTVERB' so that the pattern that has the corresponding case component structure can be converted to the target word in the order as indicated in pattern C regardless of the verb. Since there is no target word for the verb in this default word-order verbal-phrase pattern, the target word is extracted either from the basic verbal-phrase pattern matching unit 303 or from the default verbal-phrase pattern matching unit 305.

The default proposition matching unit 309 determines whether the default word-order matching unit 307 produces a complete match (step S221).

If a complete match occurs in the step S221, because the default word-order verbal-phrase pattern is a pattern in which only the word order of each component is transcribed, it is ordered by the word order and a target word of a verb is determined by the basic verbal-phrase pattern matching done partially, and the target word of a case preposition is generated in reference to the default preposition pattern (step S223).

If a complete match does not occur in the step S221, a default target sentence is generated based on specific rules (step S225).

If, in addition, the input sentence S1 is a patent document or a technical paper, for the case some verbs have fixed target words from a lexical viewpoint because they are specialized in their field, the specific-domain-application default verb database 319 is utilized for matching and a target sentence S2 completed by applying the final verbal-phrase pattern is output (step S227).

For example, when a match is carried out by applying the default preposition database 317 where a pattern "A: 국내(위치)에서 개발하다 > 在(에서) 國內(국내) 開發(개발하다)" is stored, for the adverbial preposition '에서', this pattern A can resolve the polysemy of prepositions by showing the target word '在' corresponding to the context such as the semantic code '위치' of the case component of the verb '개발하다'. And even when the verb '개발하다' is converted to '開發', it does not give rise to any problem regardless of the length and case component of the pattern as far as the Korean-Chinese technology field is concerned.

Therefore, the present invention provides with a machine-translation apparatus using multi-stage verbal-phrase patterns as well as the application and extraction methods so as to convert an input source language into a target language and resolve the polysemy that arises from a translation between different languages from the lexicological and structural linguistics viewpoints.

FIG. 3 illustrates a flowchart that explains in detail how to extract automatically default patterns from basic verbal-phrase patterns in the machine-translation apparatus of FIGS. 1A and 1B.

In the first place, patterns constructed selectively from the verbal-phrase pattern additional-construction unit 400 are stored in the basic verbal-phrase pattern database 450 (step S301).

As stated above, the default verbal-phrase pattern database automatic-extraction unit 501 arrange by verbs the patterns constructed selectively in the basic verbal-phrase pattern database 450 (step S303). Then, the patterns are rearranged, by the case component constructed for each verb, to be stored in the default verbal-phrase pattern database 313 (step S304).

Here, basic verbal-phrase patterns "A: 회사(조직)가 신약(의약품)을 개발하다 > 公司(회사) 開發(개발하다) 新藥品(신약품)" and "B: 회사(조직)가 신기술(지식)을 개발하다 > 公司(회사) 開發(개발하다) 新技術(신기술)" are arranged and compressed to a pattern '*가 *을 개발하다 >*(default) 開發 *(default)' of the verb '개발하다', and the arrangement and default conversion are carried out. The target word of the highest frequency is used as the target verb. If the frequency of target verbs is equal, they are extracted in the order of frequency of their prepositions, arranged and then stored in the default verbal-phrase patterns database 313.

Secondly, in the default word-order verbal-phrase patterns database automatic-extraction unit 503, a default word-order verbal-phrase pattern '*가 *을 DFLTVERB>*(default) DFLTVERB *(default)' is extracted S305 from default verbal-phrase patterns, e.g., '*가 *을 개발하다 >*(default) 開發 *(default)' and '*가 *을 발명하다 >*(default) 發明 *(default)' that are stored selectively in the basic verbal-phrase pattern database 450 (step S305). Then, the pattern is arranged to be stored in the basic verbal-phrase pattern database 450 (step S306).

Thirdly, in the default proposition database automatic-extraction unit 505, a prepositional target word '在' for a preposition "에서" corresponding to the context such as a verb '개발하다' and a semantic code '위치' of a case component in a prepositional pattern "위치에서 개발하다 >在" is extracted in the order of frequency, from a basic verbal-phrase pattern "A: 국내(위치)에서 개발하다 > 在(에서) 國內(국내) 開發(개발하다)" that is stored in the basic verbal-phrase pattern database 450 (step S307) The prepositional target word is arranged and then stored in the default propositions database 317 (step S308).

Finally, in a default verb database candidate automatic-extraction unit 507, for each verb of the patterns in the basic verbal-phrase pattern database 450, a high-frequency target word is extracted (step S309), and then stored in the specific-domain-application default verb database 319 in order to use it as a candidate for the default verbal target word (step S310). Here, high-frequency target verbs extracted from the verbal-phrase patterns constructed for specific-domain applications after manual verification can be used.

While the invention has been shown and described with respect to the embodiments, it will be understood by those skilled in the art that various changes and modifications may be made without departing from the scope of the invention as defined in the following claims.

What is claimed is:

1. A machine-translation apparatus using multi-level verbal-phrase patterns, comprising:
- a basic verbal-phrase pattern database storing therein basic verbal-phrase patterns;
- a default verbal-phrase pattern database storing therein default verbal-phrase patterns;
- a default word-order verbal-phrase pattern database storing therein default word-order verbal-phrase patterns;
- a default preposition database storing therein default preposition patterns;
- a simple sentence generation unit for generating, by recomposing an input sentence, an input simple sentence having a structure of verbal-phrase patterns;
- a basic verbal-phrase pattern-matching unit for trying a match of a semantic code of each case component of the input simple sentence with the basic verbal-phrase patterns;
- a default verbal-phrase pattern matching unit for trying, if the basic verbal-phrase pattern-matching unit fails a complete match, a match of a size and case prepositions of the input simple sentence with the default verbal-phrase patterns having a verb identical to that of the input simple sentence;
- a default word-order matching unit for trying, if the default verbal-phrase pattern matching unit fails a complete match, a match of a word-order of the input simple sentence with the default word-order verbal-phrase patterns having a case component structure identical to that of the input simple sentence; and
- a default preposition matching unit for generating, if the default word-order verbal-phrase pattern matching unit succeeds in a complete match, a target sentence of the input sentence with the default preposition patterns having a context identical to that of the input simple sentence.

2. The machine-translation apparatus of claim 1, wherein the basic verbal-phrase patterns stored in the basic verbal-phrase pattern database are verbal-phrase patterns selected based on target-word-varieties and/or pattern-lengths.

3. The machine-translation apparatus of claim 1, wherein the default verbal-phrase pattern database is constructed by automatically extracting verbal-phrase patterns from the basic verbal-phrase patterns, sorting the extracted verbal-phrase patterns by verbs, arranging each of the sorted verbal-phrase patterns based on a case component structure thereof, performing default-conversion by replacing case components of each of the arranged verbal-phrase patterns with a symbol representing default concept and storing in the default verbal-phrase pattern database the default-converted verbal-phrase patterns as the default verbal-phrase patterns.

4. The machine-translation apparatus of claim 1, wherein the default word-order verbal-phrase pattern database is constructed by storing therein, as the default word-order verbal-phrase patterns, the default verbal-phrase patterns where a verb of each of the default verbal-phrase patterns has been replaced with a symbol representing default concept.

5. The machine-translation apparatus of claim 1, wherein the default preposition database is constructed by storing therein prepositional target words as the default preposition patterns, the prepositional target words being extracted from the basic verbal-phrase patterns and corresponding to contexts of the basic verbal-phrase patterns.

6. The machine-translation apparatus of claim 1, further comprising a specific-domain-application default verb database storing therein high-frequency target words of verbs for a specific domain,
- wherein, if the default word-order verbal-phrase pattern matching unit succeeds in a complete match and the input sentence belongs to a document for the specific domain, the target sentence is generated with the target words stored in the specific-domain-application default verb database.

7. The machine-translation apparatus of claim 1, wherein the default verbal-phrase pattern matching unit diminishes weight of a subjective case and augments weights of case components other than the subjective case, by replacing the subjective case with a symbol representing a default concept.

* * * * *